United States Patent [19]

Piper et al.

[11] Patent Number: 5,333,883
[45] Date of Patent: Aug. 2, 1994

[54] STUFFING BOX SEAL

[75] Inventors: Michael Piper; Reimund Rienecker, both of Heidenheim; Rudi Kleinert, Herbrechtingen; Walter Schneider, Heidenheim, all of Fed. Rep. of Germany

[73] Assignee: J. M. Voith GmbH, Fed. Rep. of Germany

[21] Appl. No.: 70,592

[22] Filed: May 28, 1993

Related U.S. Application Data

[63] Continuation of Ser. No. 792,101, Nov. 14, 1991, abandoned.

[30] Foreign Application Priority Data

Nov. 14, 1991 [DE] Fed. Rep. of Germany ....... 4036217

[51] Int. Cl.$^5$ .............................................. F16J 15/18
[52] U.S. Cl. ................................... 277/102; 277/106; 277/136; 277/137
[58] Field of Search ................. 277/94, 102, 105, 106, 277/123, 136, 137, 166, 189

[56] References Cited

U.S. PATENT DOCUMENTS

| | | |
|---|---|---|
| 1,835,127 | 12/1931 | Willi . |
| 2,882,104 | 4/1959 | Guthens . |
| 3,577,833 | 5/1971 | Skelton . |
| 3,588,126 | 6/1971 | McKillop et al. . |
| 3,608,912 | 9/1971 | Tomplin . |
| 4,270,762 | 6/1981 | Johnston . |
| 4,352,499 | 10/1982 | Foster . |
| 4,640,305 | 2/1987 | Johnson . |
| 4,991,857 | 2/1991 | Pippert . |

FOREIGN PATENT DOCUMENTS

| | | |
|---|---|---|
| 564493 | 6/1960 | Belgium . |
| 27586 | of 1898 | United Kingdom . |
| 166210 | 7/1927 | United Kingdom . |
| 644017 | 10/1950 | United Kingdom . |
| 1111615 | 5/1968 | United Kingdom . |
| 2144185 | 2/1985 | United Kingdom . |

*Primary Examiner*—William A. Cuchlinski, Jr.
*Assistant Examiner*—Scott W. Cummings
*Attorney, Agent, or Firm*—Caesar, Rivise, Bernstein, Cohen & Pokotilow, Ltd.

[57] ABSTRACT

The invention relates to a stuffing box seal to provide a sealing action between a stationary wall of a housing or the like and a shaft. In accordance with the invention the shaft is provided with a collar, or with a ring or ring flange, which is sealingly connected with the shaft and is such a manner as to prevent relative twist, having an annular surface perpendicular to the axis of rotation of the shaft, against which ring surface box packing bears with a sealing action in the direction parallel to the shaft axis.

8 Claims, 2 Drawing Sheets

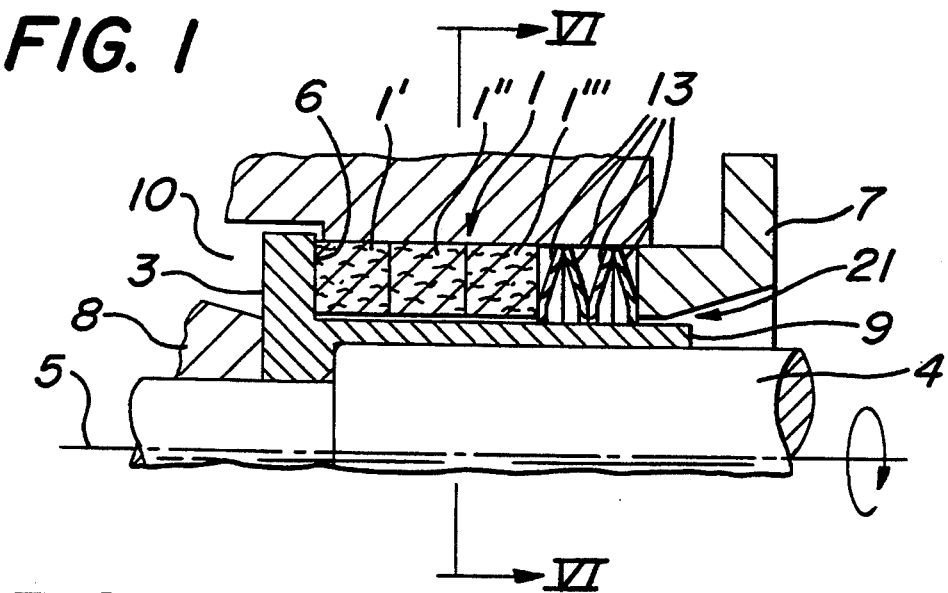
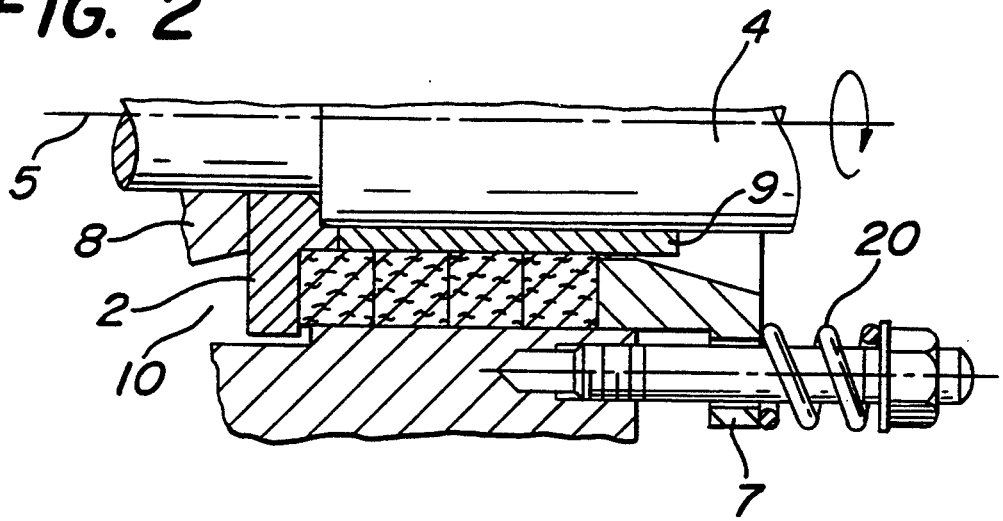
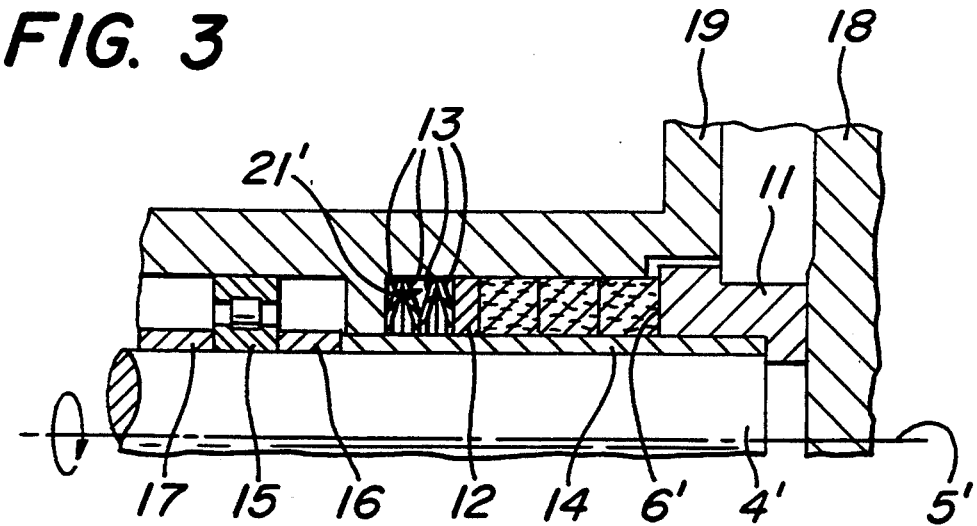

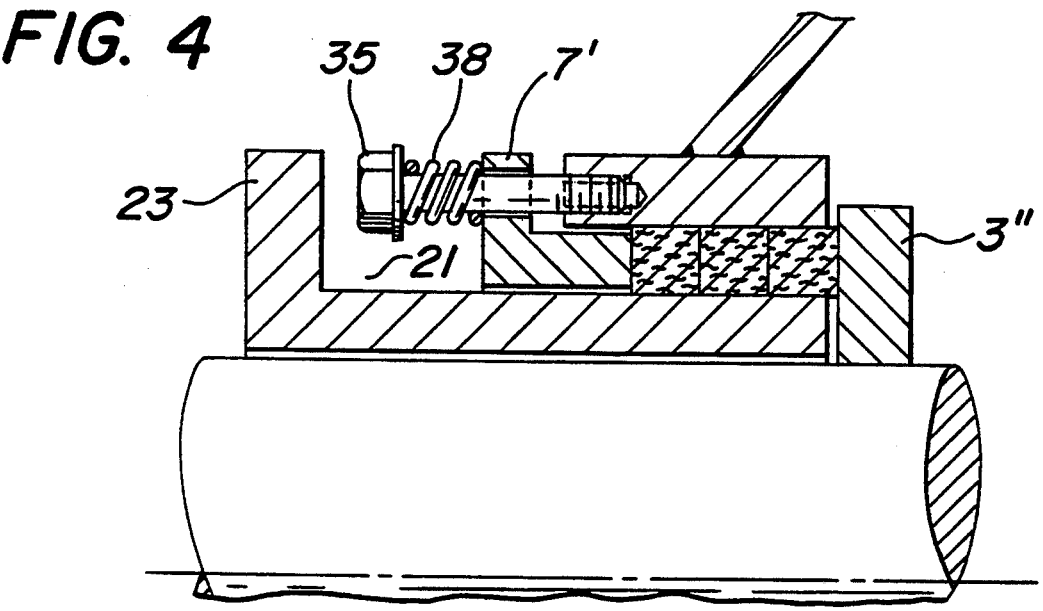
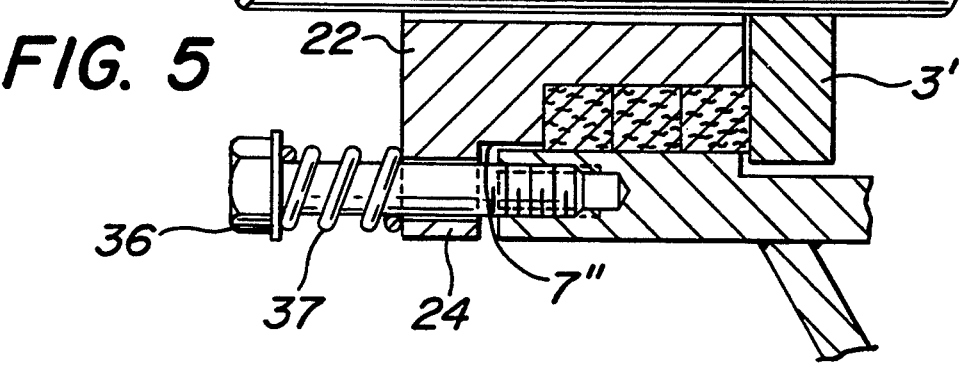
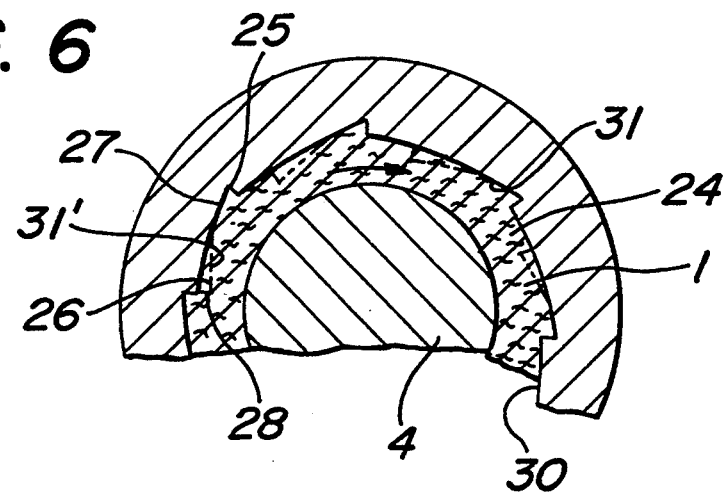

STUFFING BOX SEAL

This is a continuation application of application Ser. No. 07/792,101, filed on Nov. 14, 1991, titled "Stuffing Box Seal" now abandoned.

BACKGROUND OF THE INVENTION

This invention relates to a stuffing box seal to provide a sealing action between a stationary wall of a housing and a shaft. Such as seal is known, see the U.S. Pat. No. 3,659,862.

As is known such stuffing box seals consist of soft packing rings, which are arranged between the shaft and the respective wall of the housing or with a fixed component connected therewith in an annular space and which are sealingly urged against both the shaft and the respective housing wall by the gland. However, it frequently occurs that the shaft does not run true but slightly off center. Even if such eccentricity only amounts to 0.2 to 0.3 mm the result will be the exceedingly rapid development of a leak and intolerable losses of liquid from the space which is to be sealed off. This eccentricity of the shaft will in fact cause a widening of the stuffing box packing in the radial direction. Such eccentric running of the shaft may be entailed by imbalance or inaccuracy in manufacture or frequently however, by loads of the shaft during operation. In order to prevent radial spread of the packing of the stuffing box in the case of conventional stuffing boxes the gland has to be frequently tightened up in order to reduce the stuffing box clearance to zero again. Thus, naturally the working life of the stuffing box is substantially curtailed.

The German patent 711,850 has proposed lengthening the life of a stuffing box packing by providing an axial abutment surface for the stuffing box packing in the form of a shaft collar. This led to a certain improvement, more particularly in combination with compression springs.

Similar designs, which utilize the described principle of an axial abutment surface with a soft annular seal are described in the British patent 644,017, the British patent, 1,111,615, the Belgian patent 564,493, the French patent 403,498, and the Russian patent 918,607.

All these numerous designs in accordance with the prior art for seals based on the use of soft sealing material serve to indicate that industry has a considerable and acutely felt need for a seal with a long working life but that so far the simple solution provided by the present invention has not yet been discovered.

OBJECTS OF THE INVENTION

One object of the invention is to provide a stuffing box seal with a long working life without elaborate means having to be provided in order to compensate for imbalance of the shaft.

In the invention it is significant that using the axial sealing surface formed on the shaft and the oppositely acting spring force the normal stuffing box packing seal may be operated with a substantially longer working life. Owing to the sharp-edged which have been made in the surface there is a surprisingly simple and low-price and effective design. In this respect it has been recognized that it is important for the abutment surface of the stuffing box packing to have a larger diameter that the latter.

On the basis of practical tests it is in fact possible to assume that the axial shaft play is very small and therefore it does not lead to leakage through the radial gap of the stuffing box packing.

The design in accordance with the invention will now be described with reference to four embodiments in more detail.

BRIEF DESCRIPTION OF THE DRAWINGS

FIGS. 1 and 2 show axial sections taken through the stuffing box seals.

FIG. 3 is a view, partially in section, showing the shaft and the housing of a machine adjacent to the stuffing box seal.

FIGS. 4 and 5 show an alternative embodiment of the stuffing box seal.

FIG. 6 is a sectional view of the stuffing box seal taken along the line 6—6 of FIG. 2.

In the different figures like parts are denoted by the like reference characters with added apostrophes where appropriate.

In FIG. 1 the packing rings of the stuffing box packing 1 are referenced 1', 1" etc These rings are urged via the gland 7 against the annular flange 3 of a shaft bushing 9. The shaft bushing is in this case mounted with a force fit on the shaft 4 and it is axially held in place by means of a component 8 secured on the shaft. This component 8 may for instance be a support sleeve of the support disk of a pump impeller if in the case of the embodiment of the invention it is a question of a pump.

The axial length of the cross section of this stuffing box packing is such that the ratio thereof to its width is equal to at least 2:1 and in many cases even at least 3:1.

The gland 7 or loading bushing in this case terminates at the stuffing box packing and fails to prevent free deformation thereof in a radially inward direction for instance owing to eccentricity of the shaft.

Since the shaft bushing 9 is force fitted thereon, it is in sealing engagement with the shaft. The stuffing box packing is illustrated in the condition after prolonged use, that is to say with an enlarged gap between the shaft bushing 9 and its inner wall within an annular stuffing box space 21. This is due to the fact that the slight eccentricity of the shaft has splayed out the stuffing box packing radially. Because of this the stuffing box packing is essentially in engagement on the housing only radially. Nevertheless, there is no leakage, because the gap illustrated in the figure, which would inherently be likely to lead to leaks, is sealed off in the radial direction by the radial annular surface 6 on the shaft bushing or, respectively, on its annular flange 3. This annular surface could naturally also be provided on a ring, as shown in FIG. 2 at 2 in the radial direction. In this case it is necessary for the component 8 to make sealing engagement with the ring 2. In this case as well it is not possible for any liquid to leak out of the space 10.

By means of springs 20 the necessary loading thrust for the seal is maintained even after prolonged periods of use.

It is to be recommended that either the component which carries the annular surface 6, that is to say the ring 2, the flange ring 11 or the shaft bushing 9 be manufactured with a surface with highly wear resistant properties, as for instance chromium carbide. However it is sufficient if the respective component is provided with a coating of such a wear resistant material at the annular surface 6.

FIG. 3 shows part of the shaft 4' and the housing 19 of a machine adjacent to a stuffing box seal with a rotor 18 of, for instance, a sorting device, which has a cylindrical sieve within which the rotor rotates 18, or of a pulper. A guard bushing 14 is provided around the shaft, which locates a ring 11 on the shaft 4', said ring having an annular flange with an axial thrust surface 6', the axis of the shaft being referenced 5'. On the other side of the stuffing box packing there is a mating ring 12, which delimits a spring chamber, in which belleville washers 13 are arranged, which resiliently oppositely press against stuffing the box packing. Respective spacer rings 16 and 17 serve to locate a parallel roller bearing 15 on the shaft. It will be seen that even in the case of difficult fitting conditions there will be no major design problems. There will always be a sufficient loading action on the stuffing box packing in order to ensure a sufficient sealing action in the radial direction, that is to say the opposite support surface 6'. Preferably the external diameter of the thrust surface 6 and 6' is larger than that of the stuffing box packing.

As shown in FIGS. 4 and 5 the shaft guard bushing is omitted and instead there is a locating sleeve 21 and, respectively, 22 which delimits the annular space radially inward for the stuffing box packing so that here no wear of any part is possible, as is the case with the shaft guard bushing. For the adaptation of the stuffing box packing there is additionally in accordance with FIG. 4 a loading bushing 7', whose function is performed in the design of FIG. 5 by a projection 7" on the locating sleeve 22.

The loading bushing or gland 7 or the locating sleeve 22 is held in place by means of an external flange 23 and, respectively, 24 using screws 35 and, respectively, 36. Springs 37 and 38 are provided in order to maintain a constant pressing force by the locating sleeve 22 or, respectively, the loading bushing 7'. Here as well a locating ring 3' and, respectively, 3" is located on the shaft or, respectively, permanently connected with it. The distance between the surface irregularities is 8 to 15 percent of the circle encompassing the sharp corners.

The cross section illustrated in FIG. 6 in accordance with the cross section of FIGS. 1 and 2 shows the stuffing box bushing cavity 21, which internally is delimited by the shaft 4 and is externally delimited by a wall of the housing. The surface, which is facing the annular space 21 in the stuffing box, of the housing wall has a sharp-edged, pointed or dihedral grooves 25 with a dihedral surface 27. Pointed teeth or projections 26 are shown in broken lines on this surface with a comparatively sharp front edge 28. The direction of rotation of the shaft is as indicated by the arrow in the figure. The sharp, pointed, dihedral teeth 26 bite into the packing rings 1 and prevent relative rotation between the packing rings and the flange 9, which is force-fitted to the rotating shaft 4.

This means that the front surface of the teeth 26 is substantially radial, just like the rear surface of the grooves 25. It may also be more or less inclined against the direction of rotation. The grooves may naturally be produced by milling into the surface so that the sharp edge automatically results. The radius of filleting of the sharp edge is preferably generally under 0.2 mm.

It is best for a dihedral surface 31 or 31' to be provided in the grooves or on the teeth which is sloped at 15° at the most against the direction of rotation. The dihedral angle of the teeth 26 can be in the range of 40° to 70°.

The result is consequently a highly effective seal which is simple to produce, is reliable in operation and provides a satisfactory sealing action.

We claim:

1. A stuffing box seal, providing a sealing action between a shaft and a stationary wall of a housing, comprising:
    (a) at least two rings of stuffing box packing arranged in an annular space formed about said shaft;
    (b) a collar mounted on said shaft having an exposed axial surface generally perpendicular to the axis of rotation of said shaft against which said stuffing box packing bears in the direction of the axis of said shaft; and
    (c) said housing having a surface facing said stuffing box packing which has grooves arranged in a zig-zag manner thus forming teeth and surface irregularities parallel to the axis of rotation of said shaft, each of said irregularities having an angular sharp edge leasing in the direction of rotation.

2. The stuffing box seal of claim 1 wherein the distance between said surface irregularities is between 8 and 15 percent of the circle encompassing said sharp edges.

3. The stuffing box seal of claim 1 wherein said surface irregularities are dihedral with a dihedral angle between 40° and 70°; and the fillet radius of the sharp edges of the surface irregularities is not greater than 0.2 mm.

4. The stuffing box seal of claim 3 wherein said stuffing box seal further comprises springs located in said annular stuffing box space which press against said stuffing box packing.

5. The stuffing box seal of claim 1 wherein said stuffing box seal further comprises springs located in said annular stuffing box space which press against said stuffing box packing.

6. The stuffing box seal of claim 11 wherein said stuffing box packing comprises at least three rings with a corresponding length to width ratio in the radial cross-section of at least 3:1.

7. The stuffing box seal of claim 1 wherein said axial surface has an external diameter which is larger than the external diameter of the stuffing box packing.

8. The stuffing box seal of claim 1 wherein the dihedral surfaces of said grooves and said teeth are inclined no more than 15° in the circumferential direction.

* * * * *